(12) United States Patent
Ferrara et al.

(10) Patent No.: US 8,814,150 B2
(45) Date of Patent: *Aug. 26, 2014

(54) SHOCK ABSORBERS FOR PROTECTIVE BODY GEAR

(75) Inventors: Vincent Ferrara, Wellesley, MA (US); Alexander Reynolds, Wayland, MA (US)

(73) Assignee: Xenith, LLC, Lowell, MA (US)

( * ) Notice: Subject to any disclaimer, the term of this patent is extended or adjusted under 35 U.S.C. 154(b) by 31 days.

This patent is subject to a terminal disclaimer.

(21) Appl. No.: 13/325,728

(22) Filed: Dec. 14, 2011

(65) Prior Publication Data

US 2013/0153350 A1   Jun. 20, 2013

(51) Int. Cl.
*F16F 9/04* (2006.01)
*A42B 3/12* (2006.01)

(52) U.S. Cl.
USPC .............................. 267/139; 267/64.11; 2/413

(58) Field of Classification Search
USPC ............... 188/270; 267/136, 139, 140.11, 267/116–119, 64.27, 64.11, 270, 152, 267/140.13; 248/562, 566, 634; 2/413
See application file for complete search history.

(56) References Cited

U.S. PATENT DOCUMENTS

| | | | |
|---|---|---|---|
| 1,080,690 A | 12/1913 | Hipkiss | |
| 1,552,965 A | 9/1925 | Smith | |
| 1,560,825 A | 11/1925 | Kelticka | |
| 2,296,355 A | 9/1942 | Brady | |
| 2,759,186 A | 8/1956 | Dye | |
| 3,039,109 A | 6/1962 | Simpson | |
| 3,144,247 A | 8/1964 | Ehrenfried et al. | |
| 3,174,155 A | 3/1965 | Pitman | |
| 3,202,412 A * | 8/1965 | Trask | 267/118 |
| 3,231,454 A | 1/1966 | Reinhold et al. | |
| 3,242,500 A | 3/1966 | Derr | |
| 3,447,163 A | 6/1969 | Bothwell et al. | |
| 3,487,471 A | 1/1970 | Hagen | |
| 3,500,475 A | 3/1970 | Otsuka | |
| 3,574,379 A | 4/1971 | Jordan | |
| 3,600,714 A | 8/1971 | Cade et al. | |
| 3,609,764 A | 10/1971 | Morgan | |
| 3,666,220 A | 5/1972 | Rider | |
| 3,666,310 A | 5/1972 | Burgess et al. | |
| 3,668,704 A | 6/1972 | Conroy et al. | |

(Continued)

FOREIGN PATENT DOCUMENTS

| | | |
|---|---|---|
| DE | 3619282 | 12/1987 |
| DE | 4336665 | 5/1995 |

(Continued)

OTHER PUBLICATIONS

Certified priority document of U.S. Appl. No. 61/390,244, filed Oct. 6, 2010 for International application No. PCT/CA2011/050472, filed Aug. 1, 2011, receipt date Dec. 8, 2011.

(Continued)

*Primary Examiner* — Anna Momper
(74) *Attorney, Agent, or Firm* — Bingham McCutchen LLP

(57) ABSTRACT

Shock absorbers for integration into protective structures generally take the form of hollow, fluid-filled, compressible cells. In various embodiments, the cell enclosure includes one or more orifices, or vents, through which a fluid (such as air or water) can escape from the inner chamber formed by the enclosure.

11 Claims, 6 Drawing Sheets

(56) References Cited

U.S. PATENT DOCUMENTS

| | | | |
|---|---|---|---|
| 3,747,968 A | 7/1973 | Hornsby | |
| 3,782,511 A | 1/1974 | Parfitt | |
| 3,784,985 A | 1/1974 | Conroy | |
| 3,811,467 A | 5/1974 | Jones | |
| 3,849,801 A | 11/1974 | Holt et al. | |
| 3,872,511 A | 3/1975 | Nichols | |
| 3,877,076 A | 4/1975 | Summers et al. | |
| 3,900,222 A | 8/1975 | Muller | |
| 3,971,583 A | 7/1976 | Kornhauser | |
| 3,984,595 A | 10/1976 | Stephens | |
| 3,999,220 A | 12/1976 | Keltner | |
| 4,023,213 A | 5/1977 | Rovani | |
| 4,037,273 A | 7/1977 | Labaire | |
| 4,038,700 A | 8/1977 | Gyory | |
| 4,064,565 A | 12/1977 | Griffiths | |
| 4,067,063 A | 1/1978 | Ettinger | |
| 4,075,717 A | 2/1978 | Lemelson | |
| 4,098,434 A | 7/1978 | Uhlig | |
| 4,099,759 A | 7/1978 | Kornhauser | |
| 4,105,236 A * | 8/1978 | Haar | 293/110 |
| 4,124,904 A | 11/1978 | Matthes et al. | |
| 4,134,156 A | 1/1979 | Gyory | |
| 4,191,370 A | 3/1980 | Meyer et al. | |
| 4,192,699 A | 3/1980 | Lewicki et al. | |
| 4,213,202 A | 7/1980 | Larry | |
| 4,218,807 A | 8/1980 | Snow | |
| 4,282,610 A | 8/1981 | Steigerwald et al. | |
| 4,370,754 A | 2/1983 | Donzis | |
| 4,432,099 A | 2/1984 | Grick et al. | |
| 4,441,751 A | 4/1984 | Wesley | |
| 4,453,271 A | 6/1984 | Donzis | |
| 4,472,472 A | 9/1984 | Schultz | |
| 4,534,068 A | 8/1985 | Mitchell et al. | |
| 4,564,959 A | 1/1986 | Zahn | |
| 4,566,137 A | 1/1986 | Gooding | |
| 4,568,102 A | 2/1986 | Dauvergne | |
| 4,586,200 A | 5/1986 | Poon | |
| 4,627,114 A | 12/1986 | Mitchell | |
| 4,642,814 A | 2/1987 | Godfrey | |
| 4,700,411 A | 10/1987 | Kawasaki et al. | |
| 4,704,746 A | 11/1987 | Nava | |
| 4,710,984 A | 12/1987 | Asper et al. | |
| 4,724,549 A | 2/1988 | Herder et al. | |
| 4,883,299 A | 11/1989 | Bonar | |
| 4,916,759 A | 4/1990 | Arai | |
| 4,937,888 A | 7/1990 | Straus | |
| 4,970,729 A | 11/1990 | Shimazaki | |
| 5,042,859 A | 8/1991 | Zhang et al. | |
| 5,056,162 A | 10/1991 | Tirums | |
| 5,058,212 A | 10/1991 | Kamata | |
| 5,083,320 A | 1/1992 | Halstead | |
| 5,093,938 A | 3/1992 | Kamata | |
| 5,098,124 A | 3/1992 | Breed et al. | |
| 5,161,261 A | 11/1992 | Kamata | |
| 5,204,988 A | 4/1993 | Sakurai | |
| 5,204,998 A | 4/1993 | Liu et al. | |
| 5,235,715 A | 8/1993 | Donzis | |
| 5,263,203 A | 11/1993 | Kraemer et al. | |
| 5,319,808 A | 6/1994 | Bishop et al. | |
| 5,334,646 A | 8/1994 | Chen | |
| 5,336,708 A | 8/1994 | Chen | |
| 5,343,569 A | 9/1994 | Aare et al. | |
| 5,345,614 A | 9/1994 | Tanaka | |
| 5,388,277 A | 2/1995 | Taniuchi | |
| 5,412,810 A | 5/1995 | Taniuchi | |
| 5,500,951 A | 3/1996 | Marchello | |
| 5,548,848 A | 8/1996 | Huybrechts | |
| 5,561,866 A | 10/1996 | Ross | |
| 5,575,017 A | 11/1996 | Hefling et al. | |
| 5,678,885 A | 10/1997 | Stirling | |
| 5,713,082 A | 2/1998 | Bassette et al. | |
| 5,734,994 A | 4/1998 | Rogers | |
| 5,764,271 A | 6/1998 | Donohue | |
| 5,846,063 A | 12/1998 | Lakic | |
| 5,867,840 A | 2/1999 | Hirosawa et al. | |
| 5,881,395 A | 3/1999 | Donzis | |
| 5,911,310 A | 6/1999 | Bridgers | |
| 5,916,664 A | 6/1999 | Rudy | |
| 5,943,706 A | 8/1999 | Miyajima et al. | |
| 5,950,243 A | 9/1999 | Winters et al. | |
| 5,956,777 A | 9/1999 | Popovich | |
| 6,026,527 A | 2/2000 | Pearce | |
| 6,058,515 A | 5/2000 | Kitahara | |
| 6,065,158 A | 5/2000 | Rush, III | |
| 6,073,271 A | 6/2000 | Alexander et al. | |
| 6,098,209 A | 8/2000 | Bainbridge et al. | |
| 6,260,212 B1 | 7/2001 | Orotelli et al. | |
| 6,332,226 B1 | 12/2001 | Rush, III | |
| 6,349,909 B1 | 2/2002 | Buckley | |
| 6,351,853 B1 | 3/2002 | Halstead et al. | |
| 6,394,432 B1 * | 5/2002 | Whiteford | 267/140.13 |
| 6,401,262 B2 | 6/2002 | Bacchiega | |
| 6,425,141 B1 | 7/2002 | Ewing et al. | |
| 6,434,755 B1 | 8/2002 | Halstead et al. | |
| 6,446,270 B1 | 9/2002 | Durr | |
| 6,453,476 B1 | 9/2002 | Moore, III | |
| 6,467,099 B2 | 10/2002 | Dennis et al. | |
| 6,519,873 B1 | 2/2003 | Buttigieg | |
| 6,560,787 B2 | 5/2003 | Mendoza | |
| 6,565,461 B1 | 5/2003 | Zatlin | |
| 6,604,246 B1 | 8/2003 | Obreja | |
| 6,658,671 B1 | 12/2003 | Von Holst et al. | |
| 6,681,408 B2 | 1/2004 | Ku | |
| 6,694,529 B1 | 2/2004 | Chiu | |
| 6,704,943 B2 | 3/2004 | Calonge Clavell | |
| 6,803,005 B2 | 10/2004 | Dennis et al. | |
| 6,839,910 B2 | 1/2005 | Morrow et al. | |
| 6,908,209 B2 | 6/2005 | Miller | |
| 6,925,657 B2 | 8/2005 | Takahashi et al. | |
| 6,934,971 B2 | 8/2005 | Ide et al. | |
| 7,146,652 B2 | 12/2006 | Ide et al. | |
| 7,188,375 B2 | 3/2007 | Harrington | |
| 7,444,687 B2 | 11/2008 | Sato et al. | |
| 7,578,074 B2 | 8/2009 | Ridinger | |
| 7,774,866 B2 | 8/2010 | Ferrara | |
| 7,895,681 B2 | 3/2011 | Ferrara | |
| 2002/0023291 A1 | 2/2002 | Mendoza | |
| 2003/0221245 A1 | 12/2003 | Lee et al. | |
| 2004/0117896 A1 | 6/2004 | Madey et al. | |
| 2004/0168246 A1 * | 9/2004 | Phillips | 2/411 |
| 2004/0261157 A1 | 12/2004 | Talluri | |
| 2007/0075469 A1 * | 4/2007 | Yamazaki | 267/140.11 |
| 2007/0190292 A1 | 8/2007 | Ferrara | |
| 2007/0190293 A1 | 8/2007 | Ferrara | |
| 2010/0025902 A1 * | 2/2010 | Hofmann et al. | 267/140.13 |
| 2010/0282554 A1 | 11/2010 | Stone | |

FOREIGN PATENT DOCUMENTS

| | | | |
|---|---|---|---|
| DE | 4336665 A1 | | 5/1995 |
| FR | 1572542 | | 6/1969 |
| FR | 1572542 A | | 6/1969 |
| FR | 2561887 | | 10/1985 |
| GB | 1316722 | | 5/1973 |
| GB | 1316722 A | | 5/1973 |
| GB | 1503483 | | 3/1978 |
| GB | 1503483 A | | 3/1978 |
| GB | 2287435 | | 9/1995 |
| GB | 2287435 A | | 9/1995 |
| JP | 03282031 A | * | 12/1991 |
| JP | 04004332 A | * | 1/1992 |
| WO | WO-96/014768 | | 5/1996 |
| WO | WO-9614768 A1 | | 5/1996 |
| WO | WO-2006/005143 | | 1/2006 |
| WO | WO-2006005143 A1 | | 1/2006 |
| WO | WO-2006/089098 | | 8/2006 |
| WO | WO-2006/089234 | | 8/2006 |

(56) References Cited

FOREIGN PATENT DOCUMENTS

| WO | WO-2006/089235 | 8/2006 |
| WO | WO-2006089235 A1 | 8/2006 |
| WO | WO-2012045169 A1 | 4/2012 |

OTHER PUBLICATIONS http://www.edizone.com/availabletechnologies.html (2 pages) (copyright 2009).

Barth, J T et al. "Acceleration-Declaration Sport-Related Concussion: the Gravity of it All" Journal of Athletic Training; Sep. 2001; vol. 36, No. 3, pp. 253-256.

Hernandez, H. "Novel Helmet Liner Technology" pp. 1-6.

"Notification of Transmittal of the International Search Report and the Written Opinion of the International Searching Authority, or the Declaration", International Application No. PCT/US2007/021050, mail date Aug. 22, 2008, 13 pages.

Barth et al., "Acceleration-Deceleration Sport-Related Concussion: The Gravity of It All," Journal of Athletic Training, vol. 36, No. 3, pp. 253-256 (2001).

EdiZone Technologies, FLOAM™ / Z-FLOW™, http://www.edizone.com/technologies.html 2 pages (2004).

\* cited by examiner

SHOCK ABSORBERS FOR PROTECTIVE BODY GEAR

TECHNICAL FIELD

The present invention relates generally to shock absorbers for use in protective structures such as body gear, and more particularly to fluid-filled compressible cells.

BACKGROUND

During sports and other physical activity, individuals are often exposed to impact forces that, if not at least partially attenuated, can cause severe injury. Therefore, they usually wear protective sporting gear, such as helmets, shields, elbow and knee pads, etc. Such protective gear typically includes impact-attenuating structures that deform elastically and/or plastically in response to an impact force, thereby mechanically attenuating the impact. For example, many helmets have a crushable foam layer disposed between a rigid or semi-rigid outer shell and an inner liner that conforms the helmet to the wearer's head.

Foams are generally customized to respond optimally to a specific range of impact energies, but outside this range, their effectiveness is significantly reduced. For impact energies exceeding the high end of the range, the foam is too soft and "bottoms out"—i.e., reaches maximum compression—before the impact is fully attenuated, resulting in the transfer of high impact forces to the body. For impact energies below the optimal range, on the other hand, the foam is too hard to compress, or "ride down," sufficiently to adequately prolong the distance and time over which deceleration occurs following impact, resulting in sudden, high peak forces. The only way to improve the impact-attenuating capability of a foam layer is, typically, to decrease the density of the foam (i.e., make it softer) and increase the thickness of the layer, which results in an undesirable increase in the amount of material used. Exacerbating this trade-off, the maximum ride-down distance for most foams is only about 30-40% of the original height. Thus, about 60-70% of the foam layer add to the bulk and weight, but not the impact-absorption capacity, of the protective structure. In addition, the performance of many foams degrades rapidly with repeated impacts. Other conventional impact-absorbing layers exhibit similar problems and limitations.

More recent helmet designs feature, in place of a continuous layer, discrete fluid-filled compression cells, which resistively vent a fluid through an orifice of the cell enclosure to attenuate the impact. These cells generally have ride-down distances close to their height, exhibit superior durability, and adapt to a wide range of impact energies. Furthermore, they provide opportunities for tailoring the impact-absorption characteristics of the helmet (or other protective structure) via the cell design. Such customization opportunities, however, have rarely been exploited.

SUMMARY

The present invention provides shock absorbers for integration into protective structures, such as, for example, helmets and other protective body gear, as well as dashboards, shock-absorbing seating, and safety padding in vehicles, sporting equipment, and machinery. The shock absorbers generally take the form of hollow, fluid-filled, compressible cells. In preferred embodiments, the cell enclosure includes one or more orifices, or vents, through which a fluid (such as air or water) can escape from the inner chamber formed by the enclosure. Such compression cells utilize, simultaneously or in sequence, two impact-attenuating mechanisms: resistance of the cell enclosure to compression, and resistive fluid-venting through the orifice(s). In some embodiments, the cell attenuates impact forces by resisting compression at least initially through both the enclosure (or walls) and the fluid. Following an initial stage of the impact, the walls may yield to allow the remainder of the impact to be attenuated via resistive fluid-venting. The enclosure may include features that increase resistance to compression as the cell approaches the fully compressed state. Various embodiments of the present invention are directed to improving the energy management characteristics of the shock absorbers by tailoring the structure and shape of the enclosure, and/or the size and shape of the vents.

The compression cells may include top, bottom, and side walls, and may (but need not necessarily) be symmetrical around an axis through the center points of the top and bottom walls. For example, the cells may be disk-shaped or cylindrical. The side walls may be, without limitation, straight, angled, curved, or frustoconical, depending on the impact absorption profile desired for the particular application. In certain embodiments, two frustoconical portions of the side walls are arranged back-to-back such that the walls toe in toward a medial plane, accelerating the reduction of the inner volume as the cell collapses. The exterior shape of the cell may be adjusted to the protective structure in which it is integrated. For example, shock absorbers for use in helmets may have rounded (rather than planar) top walls to better fit between the interior liner and the shell, and/or side walls that taper toward one side to better accommodate the narrow space along the periphery of the helmet.

The wall or walls of the shock absorber may be of uniform or varying thickness, depending on the desired shock absorption profile. For example, in some embodiments, the side walls increase in thickness from the top wall toward the bottom wall, resulting in increased resistance as the top wall approaches the bottom wall during compression. In other embodiments, the side walls decrease in thickness toward the bottom, which may result in shearing of the cell during the initial phase of the impact, followed by compression. Further, corrugations in and/or structures protruding from the top and/or bottom walls may contact the opposing wall during a late stage of compression, thereby effectively increasing the number of side walls that contribute to impact absorption.

In some embodiments, the enclosure includes features that alter the rate of fluid-venting through the orifice. For example, a pin at the bottom wall may engage with (i.e., partially or totally plug) an orifice through the top wall so as to obstruct the latter when the shock absorber is compressed. Alternatively, the rim around the orifice may extend into an open tube that impedes fluid flow when it makes contact with the opposing wall. In certain embodiments, the orifice is equipped with a check valve or other structure that regulates fluid flow. These and similar features may be used individually or in various combinations to customize the shock-absorption characteristics of the compression cell.

Accordingly, in a first aspect, the invention relates to a compressible cell for attenuating impact forces imparted thereto. In various embodiments, the cell comprises an enclosure defining an inner chamber for containing a fluid; the enclosure includes a side wall, extending and varying in thickness between a top wall and a bottom wall, that resistively yields in response to an impact imparted to the top wall. The side wall may increase or decrease in thickness from the top to the bottom wall. The resistance of the yielding side walls may increase with increasing energy of the impact and/or increased compression of the side wall. The cell may shear in response to a non-perpendicular impact force. In various embodiments, the cell further comprises at least one orifice in the enclosure for resistively venting fluid from the inner chamber so as to at least partially attenuate the impact when the side wall yields.

In another aspect, the invention relates to a method involving a safety article that comprises a compressible cell including an enclosure defining an inner chamber and having a side wall extending and increasing in thickness between a top wall and a bottom wall, where the safety article is worn on a body with the bottom wall closer to the body than the top wall. The method is directed toward protecting the body from damage due to impacts and comprises, in various embodiments, attenuating an impact imparted on the top wall at least partially with the side wall by resistively yielding, where resistance to yielding increases with increased compression of the side wall. In various embodiments, the enclosure has an orifice and the method further comprises attenuating the impact at least partially by venting fluid from the inner chamber through the orifice.

In a further aspect, the invention relates to a method involving a safety article that comprises a compressible cell including an enclosure defining an inner chamber and having a side wall extending and decreasing in thickness between a top wall and a bottom wall, where the safety article is worn on a body with the bottom wall closer to the body than the top wall. The method is directed toward protecting the body from damage due to impacts and comprises, in various embodiments, attenuating a tangential component of an impact imparted on the top wall at least partially by shearing, and attenuating a normal component of the impact imparted on the top wall at least partially with the side wall by resistively yielding. In some embodiments, the enclosure has an orifice and the method further comprises attenuating the impact at least partially by venting fluid from the inner chamber through the orifice.

In another aspect, the invention pertains to a compressible cell for attenuating impact forces imparted thereto. In various embodiments, the cell comprises an enclosure defining an inner chamber for containing a fluid; the enclosure comprises a top wall including corrugations around a periphery thereof, a bottom wall, and a side wall extending between the top and bottom walls. The side wall and corrugations of the top wall resistively yield in response to an impact imparted to the top wall so as to attenuate impact forces while allowing the cell to compress. In various embodiments, the cell further comprises at least one orifice in the enclosure for resistively venting fluid from the inner chamber so as to at least partially attenuate the impact. The corrugations may increase resistance to compression of the cell as they contact the bottom wall. In various embodiments, the top wall is configured to allow lateral movement of a center region thereof relative to a periphery thereof. Furthermore, the side wall may vary in thickness between the top wall and the bottom wall.

The cell may be configured for use between an exterior shell and an interior liner of an impact-attenuating helmet, in which case the top wall may be domed so as to conform to the inner surface of the exterior shell. Moreover, the enclosure may be tapered at the top wall so as to fit between the shell and the liner in a peripheral region of the helmet.

In still a further aspect, the invention relates to a method involving a safety article that comprises a compressible cell including an enclosure defining an inner chamber, a top wall having corrugations around a periphery thereof, a bottom wall, and a side wall extending between the top and bottom walls. The safety article is worn on a body with the bottom wall closer to the body than the top wall. The method is directed toward protecting the body from damage due to impacts and comprises, in various embodiments, attenuating an impact imparted on the top wall at least partially with the side wall and the corrugations of the top wall by resistive yielding thereof. In some embodiments, the enclosure has an orifice and the method further comprises attenuating the impact at least partially by venting fluid from the inner chamber through the orifice.

In yet another aspect, the invention pertains to a compressible cell for attenuating impact forces imparted thereto, and which, in various embodiments, comprises an enclosure defining an inner chamber for containing a fluid; the enclosure comprises at least one side wall extending between a top wall and a bottom wall, and the side wall(s) resistively yield in response to an impact imparted to the top wall so as to allow the cell to compress. The top wall and/or the bottom wall comprises vertically extending features that increase resistance to compression of the cell as the top wall approaches the bottom wall. In some embodiments, the cell further comprises at least one orifice in the enclosure for resistively venting fluid from the inner chamber so as to at least partially attenuate the impact. The features may comprise corrugations around a periphery of the top wall and/or a plurality of concentrically arranged ridges on the bottom wall. In some embodiments, the side wall varies in thickness between the top wall and the bottom wall. The cell may be configured for use between an exterior shell and an interior liner of an impact-attenuating helmet, with the top wall being domed so as to conform to the inner surface of the exterior shell. The enclosure may be tapered at the top wall so as to fit between the shell and the liner in a peripheral region of the helmet.

In still a further aspect, the invention relates to a method involving a safety article that comprises a compressible cell including an enclosure defining an inner chamber, a side wall, and top and bottom walls at least one of which includes vertically extending features. The safety article is worn on a body with the bottom wall closer to the body than the top wall. The method is directed toward protecting the body from damage due to impacts and in various embodiments comprises, in response to an impact imparted to the top wall, attenuating the impact at least partially with the side wall by resistive yielding thereof; and attenuating the impact at least partially with the vertically extending features as the top wall approaches the bottom wall. The enclosure may have an orifice, and the method may further comprise attenuating the impact at least partially by venting fluid from the inner chamber through the orifice.

In a further aspect, the invention pertains to a compressible cell for attenuating impact forces imparted thereto, and which, in various embodiments, comprises an enclosure defining an inner chamber for containing a fluid; the enclosure compresses in response to an impact. The cell also includes at least one orifice in the enclosure for resistively venting fluid from the inner chamber during the compression so as to at least partially attenuate the impact, and a valve for partially obstructing the orifice so as to increase resistance to the compression. In various embodiments the enclosure comprises top and bottom walls, and the resistance to the compression of the cell is increased by the partial obstruction of the orifice as the top wall approaches the bottom wall. Some or all of the walls may resistively yield in response to the impact, thereby partially attenuating the impact while allowing the cell to compress. In various embodiments, the valve comprises a pin protruding from the bottom wall opposite the orifice, where the pin, in a compressed state of the cell, engages the orifice so as restrict fluid venting therethrough.

Alternatively, the valve may comprise a tubular protrusion extending downward from the top wall and surrounding the orifice. The tubular protrusion self-restricts the orifice due to increased fluid turbulence.

Yet another aspect of the invention relates to a method involving a safety article that comprises a compressible cell that includes an enclosure defining an inner chamber and having an orifice and a valve therein. The method is directed toward protecting the body from damage due to impacts and comprises, in various embodiments, attenuating an impact imparted on the enclosure at least partially by resistively venting fluid from the inner chamber through the orifice, whereby the enclosure compresses, during compression of the enclosure, increasing a resistance to compression by partially and increasingly obstructing the orifice with the valve.

Still another aspect of the invention pertains to a compressible cell for use between an exterior shell and an interior liner of an impact-attenuating helmet. In varioius embodiments, the cell comprises an enclosure comprising a top wall, a bottom wall, and at least one side wall that resists yielding in response to an impact at least during an initial phase thereof, the enclosure defining an inner chamber for containing a fluid; and at least one orifice in the enclosure for resistively venting fluid from the inner chamber so as to at least partially attenuate the impact after the initial phase, wherein the top wall is domed so as to conform to an inner surface of the exterior shell.

In yet another aspect, the invention relates to a protective helmet comprising an exterior shell, an interior liner placed inside the shell, and, disposed between the shell and the liner, at least one compressible cell comprising (i) an enclosure defining an inner chamber and comprising a top wall, a bottom wall, and side walls that resist yielding in response to an impact at least during an initial phase thereof, the top wall being domed so as to conform to an inner surface of the exterior shell, and (ii) at least one orifice in the enclosure for resistively venting fluid from the inner chamber so as to at least partially attenuate the impact after the initial phase.

In a further aspect, the invention pertains to a compressible cell for use between an exterior shell and an interior liner of an impact-attenuating helmet. In various embodiments, the cell comprises an enclosure including a top wall, a bottom wall, and side walls that resist yielding in response to an impact at least during an initial phase thereof, the enclosure defining an inner chamber for containing a fluid; and at least one orifice in the enclosure for resistively venting fluid from the inner chamber so as to at least partially attenuate the impact after the initial phase, wherein the enclosure is tapered at the top wall so as to fit between the shell and liner in a peripheral region of the helmet.

In another aspect, the invention relates to a protective helmet comprising an exterior shell; an interior liner placed inside the shell, where the distance between the exterior shell and the liner decreases in a peripheral region of the helmet; and disposed between the shell and the liner, at least one compressible cell comprising (i) an enclosure defining an inner chamber and comprising a top wall, a bottom wall, and side walls that resist yielding in response to an impact at least during an initial phase thereof, the enclosure being tapered at the top wall so as to fit between the shell and the liner in the peripheral region of the helmet, and (ii) at least one orifice in the enclosure for resistively venting fluid from the inner chamber so as to at least partially attenuate the impact after the initial phase.

BRIEF DESCRIPTION OF THE DRAWINGS

The foregoing will be more readily understood from the following detailed description, in particular, when taken in conjunction with the drawings, in which.

DETAILED DESCRIPTION

Shock absorbers in accordance herewith can be fabricated from a variety of elastic and semi-elastic materials, including, for example, rubbers, thermoplastics, and other moldable polymers. A particularly suited material, due its durability, resiliency, and amenability to blow molding or injection molding, is thermoplastic elastomer (TPE); commercially available TPEs include the ARNITEL and SANTOPRENE brands. Other materials that may be used include, for example, thermoplastic polyurethane elastomers (TPUs) and low-density polyethylene (LDPE). In general, the material selection depends on the particular application, and can be readily made, without undue experimentation, by a person of skill in the art based on known material properties. Further, the desired shape and configuration of the shock absorber enclosure can generally be created using any of a number of well-known manufacturing techniques, such as, e.g., blow molding or injection molding. The shock absorber may be manufactured in one piece, or in two or more parts that are subsequently bonded together to form a fluid-tight enclosure. Bonding may be accomplished, for example, with an adhesive (such as glue), or using a thermal bonding process.

Mechanically interlocking features, clamps, or similar devices may be used to assure that the multiple parts remain affixed to each other.

Figure 1A:
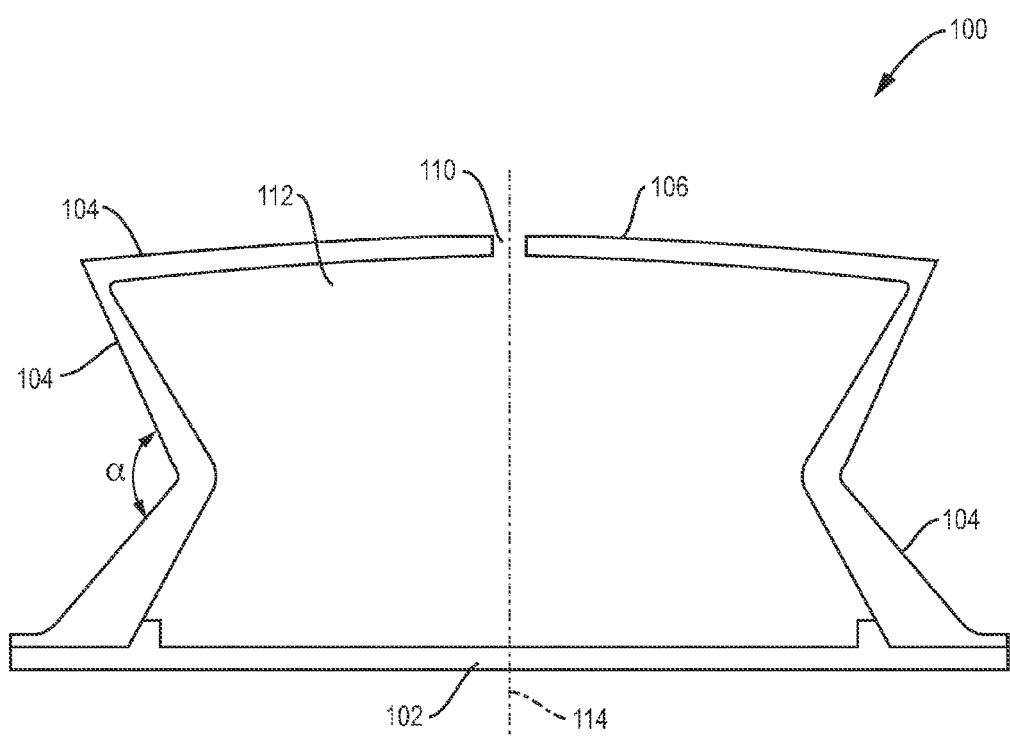
FIG. 1A is a schematic cross-sectional view of a shock absorber enclosure in accordance with one embodiment, which features side walls including an exterior obtuse angle and increasing in thickness toward the bottom plate.

FIG. 1A schematically illustrates an exemplary shock absorber cell 100 in accordance with various embodiments. The cell includes a flat bottom plate 102 and, secured thereto, a cap 104 forming the top wall 106 and side walls 108 of the structure. An orifice or vent 110 through the top wall 106 allows fluid to exit from the interior chamber 112 formed by the cell enclosure as the cell is compressed during an impact, as well as to enter the chamber as the cell returns to its original shape following the impact. Although only one orifice is shown, various embodiments use multiple orifices of the same or different shapes and sizes. The orifice(s) need not go through the top wall, but may generally be located in any portion of the cell enclosure. Further, instead of being simple holes or slits, the orifices may be equipped with valve structures that regulate flow therethrough. For example, in some embodiments, check valves that allow only inflow are provided at the bottom wall of the cell, and check valves that permit only outflow are included in the top wall, or vice versa.

Returning to FIG. 1A, the side walls 108 form two back-to-back frustoconical portions that meet with their narrower end at a horizontal plane located between the top and bottom walls 106, 102, such that they define an obtuse exterior angle α. Thus, when the cell 100 collapses, the side walls 108 move inward toward a central axis 114 of the cell, thereby reducing the volume of the cell and further compressing the air therein. This may result in increased turbulence of the air escaping through the orifice 110 and, thus, in increased resistance to compression. Further, as shown, the side walls 108 increase in thickness between the top and bottom walls. As a result, the resistance that the walls 108 themselves provide to the impact increases steadily throughout the duration of the compression. As will be readily apparent to one of skill in the art, variations of the wall thickness along its height can generally be used to tailor the temporal energy management profile of the cell, as characterized, for example, in terms of the residual force transmitted through the cell as a function of time.

Figure 1B:
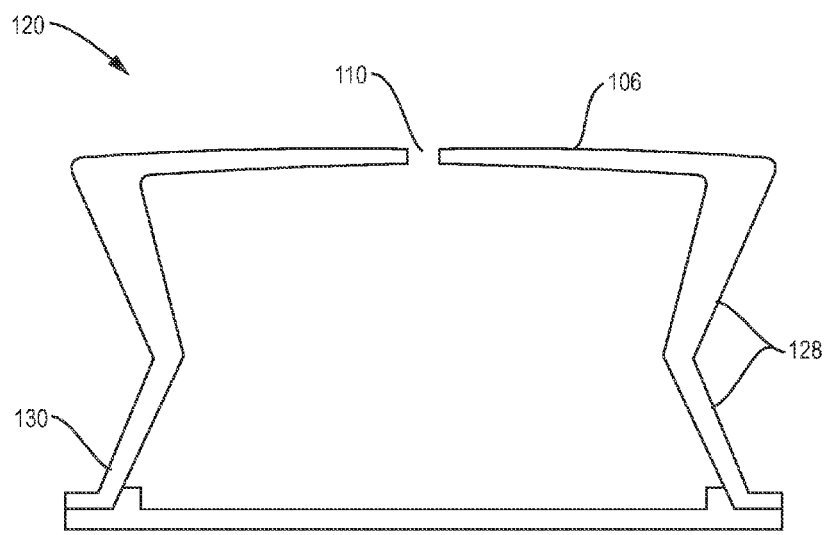
FIG. 1B is a schematic cross-sectional view of a shock absorber enclosure in accordance with one embodiment, which features side walls including an exterior obtuse angle and decreasing in thickness toward the bottom plate.

FIG. 1B illustrates an alternative compression cell 120, in which the thickness of the side walls 128 increases toward the top wall 106. (Other than that, the cell 120 is similar to the cell 100 depicted in FIG. 1A.) The thin portion 130 of the wall 128 near the bottom plate 102 constitutes a "weak spot" of the cell enclosure, which allows the cell to initially shear in response to an impact force that includes a component parallel to the top surface (i.e., a tangential force), thereby dissipating tangential forces. During later phases of the impact, energy is absorbed via compression of the thicker wall portions near the top wall 106.

Figure 1C:
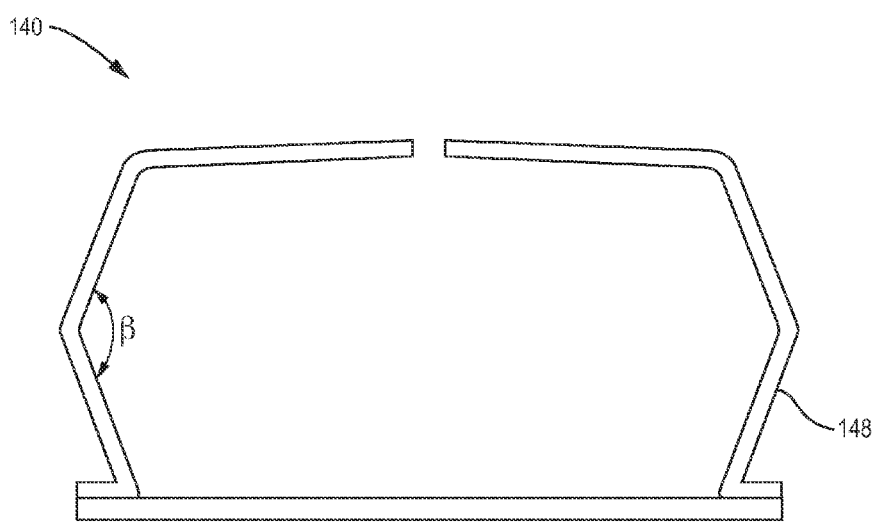
FIG. 1C is a schematic cross-sectional view of a shock absorber enclosure in accordance with one embodiment, which features side walls of uniform thickness that include an interior obtuse angle.

FIG. 1C shows yet another shock absorber structure 140, which includes walls of substantially uniform thickness. In this embodiment, the side walls 148 are angled so as to define an interior obtuse angle β, and, consequently, they collapse outwardly. Accordingly, the cell enclosure provides somewhat lower resistance to collapse then that of the cells 100, 120 with inverted walls depicted in FIGS. 1A and 1B. These and other cell wall designs may be combined with additional features as described below.

Figure 2A:
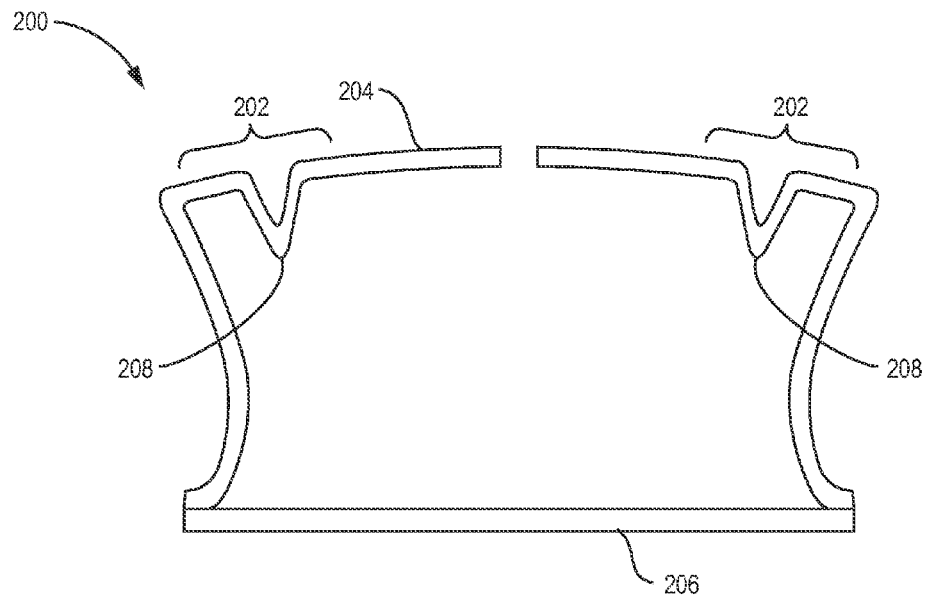
FIG. 2A is a schematic cross-sectional view of a shock absorber enclosure in accordance with one embodiment, which features corrugations in the top wall.

In some embodiments, the top and/or bottom walls of the shock absorber are not flat (as depicted in FIGS. 1A-1C), but include corrugations or features vertically protruding therefrom. Such features can provide increased resistance during late stages of cell compression. For example, FIG. 2A shows a shock-absorber cell 200 with one or more "V-shaped" corrugations 202 around a periphery of the top wall 204. As the cell is 200 compressed, the top wall 204 approaches the bottom wall 206, and the lowest points 208 of the corrugations 202 eventually contact the bottom wall 206. Effectively, this increases the number of side walls against which the impact forces work and, thus, inhibits further compression of the cell 200. As a result, the shock absorber cell 200 can withstand larger impact forces before it bottoms out. Moreover, flexure of the corrugations 202 facilitates lateral motion of the center region of the top wall 204 relative to the periphery in response to shear forces. Thus, in addition to increasing the cell's resistance to normal forces, the corrugations 202 help dissipating shear forces.

Figure 2B:
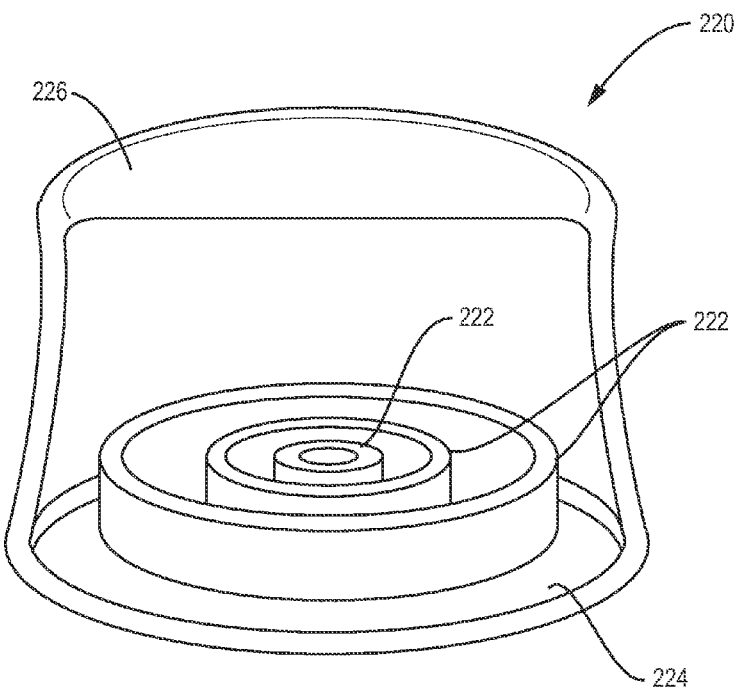
FIG. 2B is a schematic cut-away view of a shock absorber enclosure in accordance with one embodiment, which features nested cylindrical walls protruding from the bottom wall.

FIG. 2B illustrates another design for a shock-absorbing cell 220, in which a plurality of concentric circular ridges 222 are arranged on the bottom wall 224. When the top wall reaches these ridges 222 during compression of the cell 220, the ridges 222 begin contributing to the absorption of the impact, resulting in a higher overall resistance of the shock absorber to compression. The above-described corrugations and vertically protruding features are merely examples; corrugations and protrusions of different shapes and configurations, attached to the top wall, the bottom wall, or both, may likewise be used to achieve similar effects.

Figure 3A:
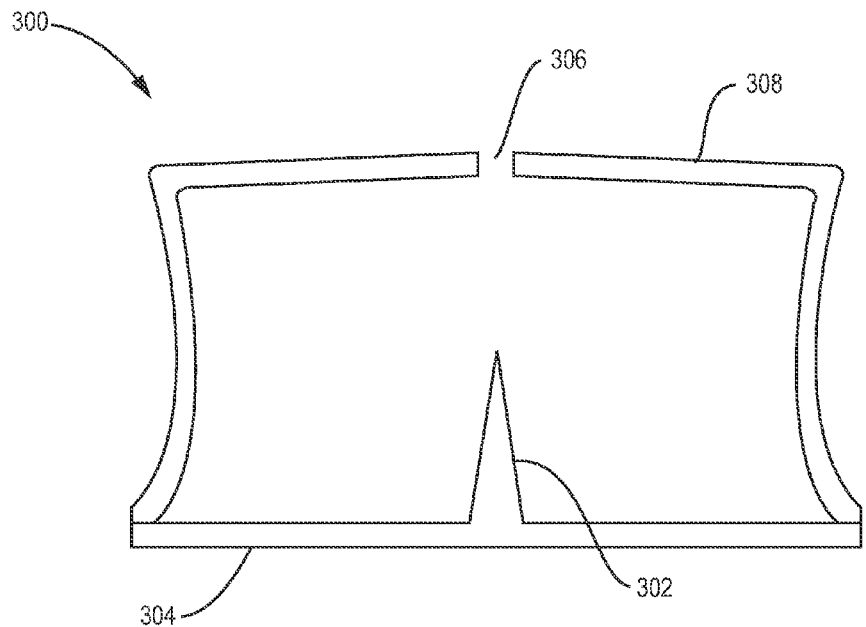
FIG. 3A is a is a schematic cross-sectional view of a shock absorber enclosure in accordance with one embodiment, which features a pin protruding from the bottom wall opposite an orifice through the top wall.
Figure 3B:
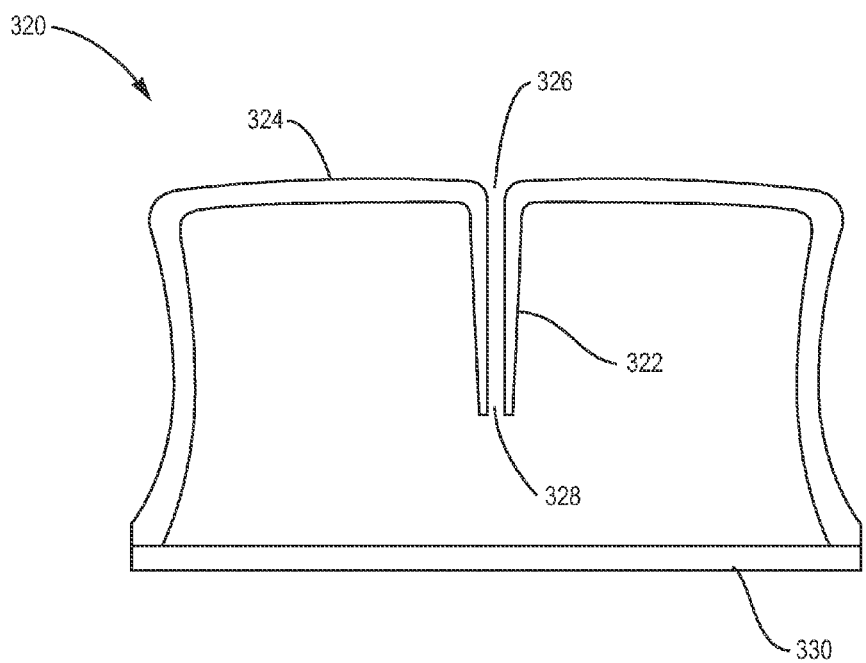
FIG. 3B is a schematic cross-sectional view of a shock absorber enclosure in accordance with one embodiment, which features a tubular protrusion extending from the top wall and surrounding an orifice therethrough.

FIGS. 3A and 3B illustrate shock absorbers in which the configuration of the orifice and, consequently, the rate of fluid flow therethrough change depending on the compression state of the cell. For example, FIG. 3A shows a compression cell that includes a long, conical pin 302 protruding from bottom wall 304 opposite an orifice 306 through the top wall 308. Once the cell 300 has been sufficiently compressed in response to the impact (e.g., to about half its original height as shown in the figure), the pin 302 is received within and penetrates the orifice 306, thereby reducing the area through which fluid can escape. Eventually the pin 302 completely obstructs the orifice, preventing any further fluid-venting. Thus, the orifice 306 and pin 302 together function as a valve.

FIG. 3B shows an alternative embodiment 320, in which valve-like behavior is created by a tubular protrusion 322 that extends vertically downward from the top wall 324 and includes a lumen 326 therethrough. The tubular protrusion 322 can restrict fluid-venting via two mechanisms. As can be readily seen, fluid venting through the lumen 326 requires the fluid to enter the tube 322 at the end 328 close to the bottom wall 330. Accordingly, as this end 328 contacts the bottom wall, venting is precluded or at least inhibited. In addition, and generally more importantly, the tube 322 can be made of a thickness and material that allows it to constrict and self-restrict the orifice in response to increased fluid turbulence, much like a balloon that releases air through the opening.

Figure 4:
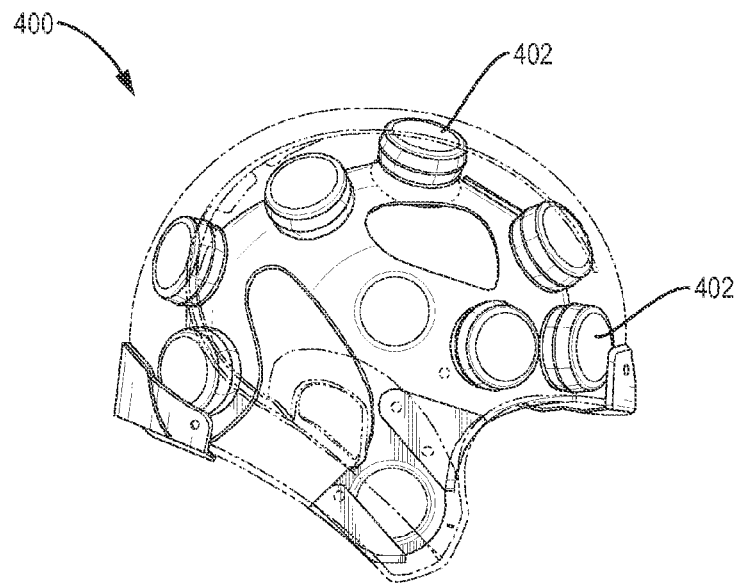
FIG. 4 is an elevational view of a protective helmet with multiple distributed compression cells in accordance with one embodiment.

Shock absorbers as described above may employed advantageously in a variety of applications, including, for example, protective body gear, vehicle dash boards, and shock-absorbing seats. FIG. 4 illustrates, as one exemplary application, a protective helmet 400 including multiple compression cells 402 distributed between a shell and a helmet liner. The shock absorbers 402 may include any combination of the features described above. Further, they may be shaped to accommodate the space between the shell and liner. For example, FIG. 5A shows a shock absorber cap $500_A$ (omitting the bottom wall) that has an elevated, rounded top wall 502 with a curvature complementary to that of the interior surface of the helmet shell. Further, the shock absorber features one or more "V-shaped" corrugations 202 around the periphery of the top wall 502, and inwardly angled side walls 505 with that increase in thickness toward the bottom. The rounded top wall and corrugation(s) cooperate to allow the cell top to shift laterally in response to shear forces.

Figure 5C:
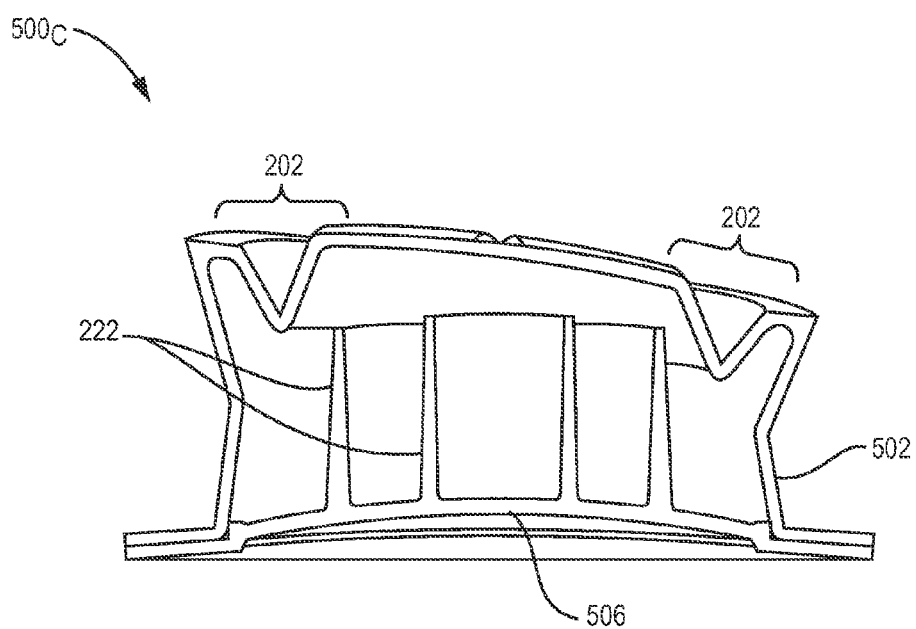
FIG. 5C is a sectional view of a shock absorber enclosure in accordance with another embodiment, which features varying wall thickness, corrugations along the circumference of the top wall, and a valve protruding from the top wall.
Figure 5A:
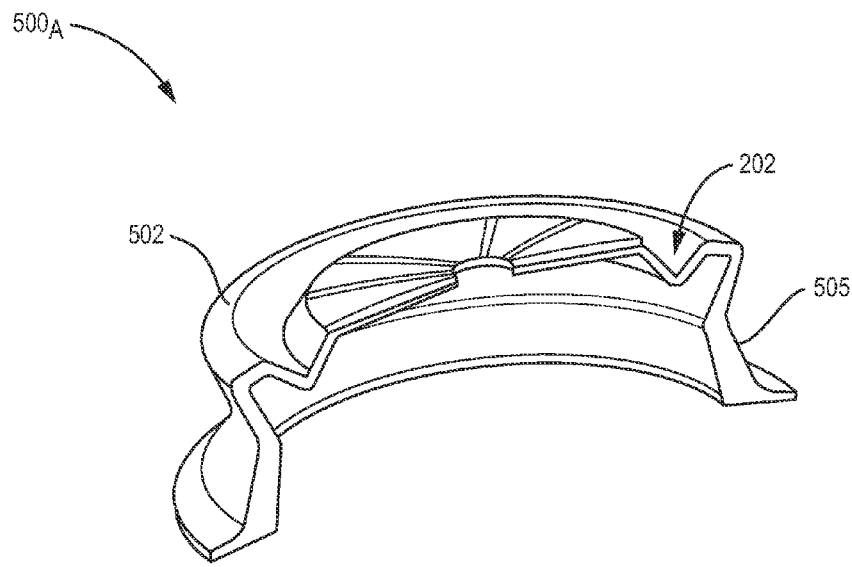
FIG. 5A is a perspective sectional view of a shock absorber enclosure in accordance with one embodiment, side walls of varying thickness, a rounded top wall, and corrugations along the circumference of the top wall.
Figure 5B:
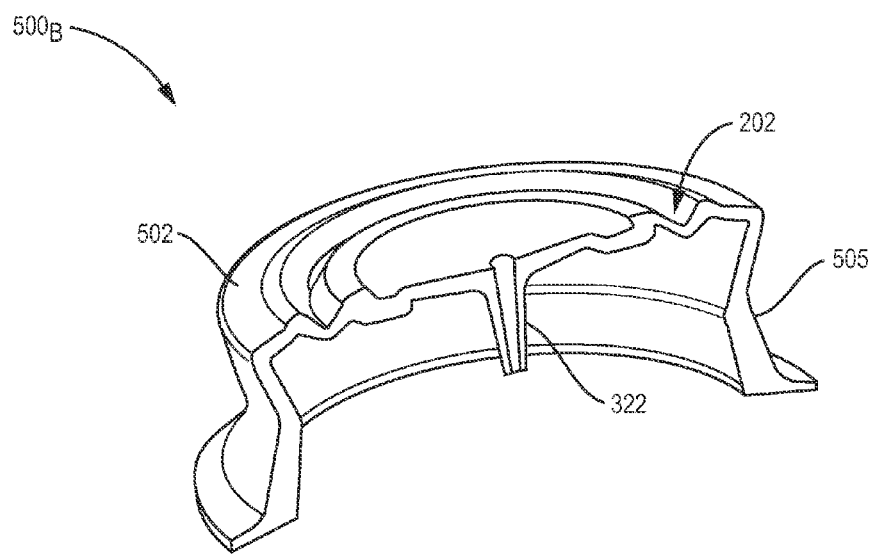
FIG. 5B is a perspective sectional view of a shock absorber enclosure similar to that of FIG. 5A, which further tapers off toward one side so as to better fit into peripheral space of a protective helmet.

FIG. 5B illustrates a shock absorber $500_B$ suitable for use in areas of the helmet that curve back in toward the head, e.g., the occipital lock area on the back of the helmet and the areas on the lower sides. The shock absorber $500_B$ has an elevated, rounded top wall 502 with a curvature complementary to that of the interior surface of the helmet shell. Further, the shock absorber features one or more "V-shaped" corrugations 202 around the periphery of the top wall 502, and inwardly angled side walls 505 with that increase in thickness toward the bottom. The enclosure of this shock absorber tilts toward one side, i.e., the side wall height decreases across a diameter of the shock absorber such that, properly placed, it sits flush against the shell. The shock absorber $500_B$ includes a tubular protrusion 322 that extends vertically downward from the top wall 502 and includes a lumen therethrough. The radial grooves illustrated in FIGS. 5A and 5B are vents that permit air to travel over the surface of the shock absorber upon impact.

FIG. 5C illustrates another shock-absorbing cell $500_C$ having side walls whose collective height decreases across a diameter of the shock absorber to conform to a space of non-uniform height. This cell combines side walls 502 toeing in toward a medial plane and increasing in thickness toward the bottom, corrugations 202 in the top wall, and a plurality of concentric circular ridges 222 arranged on the bottom wall 506. These features cooperate to increase the cell's resistance to compression as a highly compressed state is reached and, thus, collectively increase the energy levels that can effectively be absorbed without increasing the height of the shock absorber structure.

Certain embodiments of the present invention are described above. It is, however, expressly noted that the present invention is not limited to those embodiments; rather, additions and modifications to what is expressly described herein are also included within the scope of the invention. Moreover, it is to be understood that the features of the various embodiments described herein are not, in general, mutually exclusive and can exist in various combinations and permutations, even if such combinations or permutations are not made express herein, without departing from the spirit and scope of the invention. In fact, variations, modifications, and other implementations of what is described herein will occur to those of ordinary skill in the art without departing from the spirit and the scope of the invention. As such, the invention is not to be defined only by the preceding illustrative description.

What is claimed is:

1. A compressible cell for attenuating impact forces imparted thereto, the cell comprising:
    an enclosure defining an inner chamber for containing a fluid, the enclosure comprising a non-corrugated bottom wall, a top wall including at least one corrugation defining a periphery around a central portion of the top wall and being spaced from the bottom wall, and a side wall extending between the top and bottom walls, the side wall and the at least one corrugation of the top wall resistively yielding in response to an impact imparted to the top wall so as to attenuate impact forces while allowing the cell to compress, the enclosure further comprises at least one orifice for resistively venting fluid from the inner chamber so as to at least partially attenuate the impact.

2. The cell of claim 1, wherein the at least one corrugation increase resistance to compression of the cell as they contact the bottom wall.

3. The cell of claim 1, wherein the top wall is configured to allow lateral movement of a center region thereof relative to a periphery thereof.

4. The cell of claim 1, wherein the side wall varies in thickness between the top wall and the bottom wall.

5. The cell of claim 1, wherein the cell is configured for use between an exterior shell and an interior liner of an impact-attenuating helmet, the top wall being domed so as to conform to an inner surface of the exterior shell.

6. The cell of claim 5, wherein the enclosure is tapered at the top wall so as to fit between the shell and the liner in a peripheral region of the helmet.

7. The cell of claim 1, wherein the at least one corrugation of the top wall is configured to increase resistance to compression of the cell upon contact with the bottom wall.

8. In a safety article comprising a compressible cell that includes an enclosure defining an inner chamber, a top wall having at least one corrugation defining a periphery around a central portion of the top wall, a non-corrugated bottom wall, and a side wall extending between the top and bottom walls, the safety article being worn on a body with the bottom wall closer to the body than the top wall, a method for protecting the body from damage due to impacts, the method comprising:
    attenuating an impact imparted on the top wall at least partially with the side wall by resistive yielding thereof; and
    upon contact of the corrugations with the bottom wall, attenuating the impact at least partially with the side wall and the corrugations of the top wall by resistive yielding thereof.

9. The method of claim 8 wherein the enclosure has an orifice, the method further comprising attenuating the impact at least partially by venting fluid from the inner chamber through the orifice.

10. In a safety article comprising a compressible cell that includes an enclosure defining an inner chamber, a side wall, and top and bottom walls at least one of which is uncorrugated and includes at least one feature vertically joined thereto and extending therefrom only partially into the inner chamber, the safety article being worn on a body with the bottom wall closer to the body than the top wall, a method for protecting the body from damage due to impacts, the method comprising:
    in response to an impact imparted to the top wall, attenuating the impact at least partially with the side wall by resistive yielding thereof; and
    upon contact of the at least one vertically extending feature with a wall opposite thereto, attenuating the impact at least partially with the vertically extending features.

11. The method of claim 10, wherein the enclosure has an orifice, the method further comprising attenuating the impact at least partially by venting fluid from the inner chamber through the orifice.

* * * * *